United States Patent
Koga

(10) Patent No.: US 12,280,791 B2
(45) Date of Patent: Apr. 22, 2025

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventor: Futoshi Koga, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 269 days.

(21) Appl. No.: 17/695,010

(22) Filed: Mar. 15, 2022

(65) Prior Publication Data
US 2022/0194409 A1    Jun. 23, 2022

Related U.S. Application Data

(63) Continuation of application No. PCT/JP2019/036619, filed on Sep. 18, 2019.

(51) Int. Cl.
*B60W 50/14*    (2020.01)
*B60W 40/105*    (2012.01)

(52) U.S. Cl.
CPC .......... *B60W 50/14* (2013.01); *B60W 40/105* (2013.01); *B60W 2050/146* (2013.01);
(Continued)

(58) Field of Classification Search
CPC ............... B60W 50/14; B60W 40/105; B60W 2050/146; B60W 2554/4026; B60W 2554/4049
See application file for complete search history.

(56) References Cited

U.S. PATENT DOCUMENTS 10,380,894 B2    8/2019   Sawato et al.
10,532,695 B2    1/2020   Imbe
(Continued)

FOREIGN PATENT DOCUMENTS

CN    107408342 A    11/2017
CN    108538084 A    9/2018
(Continued)

OTHER PUBLICATIONS

International Search Report and Written Opinion for PCT/JP2019/036619 mailed Dec. 24, 2019.
(Continued)

*Primary Examiner* — Hunter B Lonsberry
*Assistant Examiner* — Harrison Heflin
(74) *Attorney, Agent, or Firm* — Thomas | Horstemeyer, LLP

(57) ABSTRACT

A driving assistance device comprises an information acquisition unit that acquires movement information including a vehicle category indicating that the other vehicle is of four- or two-wheeled type, and information relating to a position and a speed of the other vehicle. The information acquisition unit determines whether the other vehicle traveling behind the vehicle is of the four- or two-wheeled type on the basis of the vehicle category. If the other vehicle is a four-wheeled vehicle, the information acquisition unit acquires speed information of the four-wheeled vehicle from four-wheeled vehicles located within a first width range in a vehicle width direction of the vehicle. If the other vehicle is a two-wheeled vehicle, the information acquisition unit acquires speed information of the two-wheeled vehicle from two-wheeled vehicles located within a second width range narrower than the first width range in the vehicle width direction of the vehicle.

5 Claims, 5 Drawing Sheets

(52) U.S. Cl.
CPC .............. *B60W 2554/4026* (2020.02); *B60W 2554/4049* (2020.02)

(56) References Cited

U.S. PATENT DOCUMENTS

| | | | |
|---|---|---|---|
| 10,901,078 B2 | 1/2021 | Aoyagi et al. | |
| 10,930,154 B2 | 2/2021 | Yamada et al. | |
| 2011/0032118 A1* | 2/2011 | Robaz | G08G 1/163 340/902 |
| 2014/0236414 A1* | 8/2014 | Droz | G06V 20/58 701/1 |
| 2016/0253905 A1 | 9/2016 | Sawato et al. | |
| 2018/0001819 A1 | 1/2018 | Imbe | |
| 2018/0259636 A1 | 9/2018 | Aoyagi et al. | |
| 2019/0080611 A1 | 3/2019 | Yamada et al. | |
| 2019/0088126 A1* | 3/2019 | Banvait | G08G 1/0112 |
| 2020/0047755 A1* | 2/2020 | Dorenkamp | B60W 50/14 |
| 2020/0398847 A1* | 12/2020 | Fang | B60W 30/18154 |
| 2020/0401820 A1* | 12/2020 | Nagata | G06T 7/20 |
| 2021/0237734 A1* | 8/2021 | Buburuzan | G08G 1/096791 |

FOREIGN PATENT DOCUMENTS

| | | |
|---|---|---|
| CN | 109472975 A | 3/2019 |
| EP | 2101305 A2 | 9/2009 |
| JP | 2002-109694 A | 4/2002 |
| JP | 2009-217438 A | 9/2009 |
| JP | 2017-123013 A | 7/2017 |
| JP | 2017-224164 A | 12/2017 |
| WO | 2015/064745 A1 | 5/2015 |
| WO | 2017/082370 A1 | 5/2017 |
| WO | 2021/053763 A1 | 3/2021 |

OTHER PUBLICATIONS

Chinese Office Action for Chinese Patent Application No. 201980100139.4 mailed Apr. 28, 2023.

* cited by examiner

DRIVING ASSISTANCE DEVICE, DRIVING ASSISTANCE METHOD, AND STORAGE MEDIUM

CROSS-REFERENCE TO RELATED APPLICATION(S)

This application is a continuation of International Patent Application No. PCT/JP2019/036619 filed on Sep. 18, 2019, the entire disclosures of which are incorporated herein by reference.

BACKGROUND OF THE INVENTION

Field of the Invention

The present invention relates to a driving assistance device, driving assistance method, and storage medium for a vehicle.

Description of the Related Art

Japanese Patent Laid-Open No. 2017-123013 discloses a technology for sensing other vehicles traveling in the vicinity of a self-vehicle and notifying a driver when an approaching vehicle is sensed.

However, during traffic congestion or the like, other vehicles in the vicinity of a vehicle (self-vehicle) are closer to the self-vehicle than in a normal traveling state, and with the use of cameras or sensors, it may not be possible to sense in advance a two-wheeled vehicle that runs through a plurality of other vehicles and approaches the self-vehicle.

The present invention provides a driving assistance technology capable of notifying a driver of the presence of a two-wheeled vehicle traveling beside four-wheeled vehicles located behind a vehicle, and approaching the vehicle.

SUMMARY OF THE INVENTION

According to one aspect of the present invention, there is provided a driving assistance device that assists in driving a vehicle, the driving assistance device comprising: a communication unit capable of communicating via a network with another vehicle around the vehicle; an information acquisition unit configured to acquire movement information including a vehicle category indicating that the other vehicle is of four- or two-wheeled type, and information relating to a position and a speed of the other vehicle, on the basis of the communication of the communication unit; an identification unit configured to identify the other vehicle located behind the vehicle on the basis of a comparison between positional information of the vehicle and the positional information of the other vehicle included in the movement information; a speed comparison unit configured to compare a speed of a four-wheeled vehicle located behind the vehicle with a speed of a two-wheeled vehicle on the basis of the movement information; a determination unit configured to determine whether the two-wheeled vehicle is traveling beside the four-wheeled vehicle and approaching the vehicle, on the basis of a result of the comparison; and a notification unit configured to notify a driver of the vehicle of a result of the determination when it is determined that the two-wheeled vehicle approaching the vehicle is present, wherein the information acquisition unit determines whether the other vehicle traveling behind the vehicle is of the four- or two-wheeled type on the basis of the vehicle category in the movement information, if the other vehicle is a four-wheeled vehicle, acquires speed information of the four-wheeled vehicle from four-wheeled vehicles located within a first width range in a vehicle width direction of the vehicle, and if the other vehicle is a two-wheeled vehicle, acquires speed information of the two-wheeled vehicle from two-wheeled vehicles located within a second width range narrower than the first width range in the vehicle width direction of the vehicle.

According to the present invention, it is possible to notify a driver of the presence of a two-wheeled vehicle traveling beside four-wheeled vehicles located behind a vehicle, and approaching the vehicle.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF EMBODIMENTS

Hereinafter, embodiments of the present invention will be described with reference to the drawings. The components described in these embodiments are merely examples and are not limited by the following embodiments.

[Configuration of Driving Assistance Device]

Figure 1:
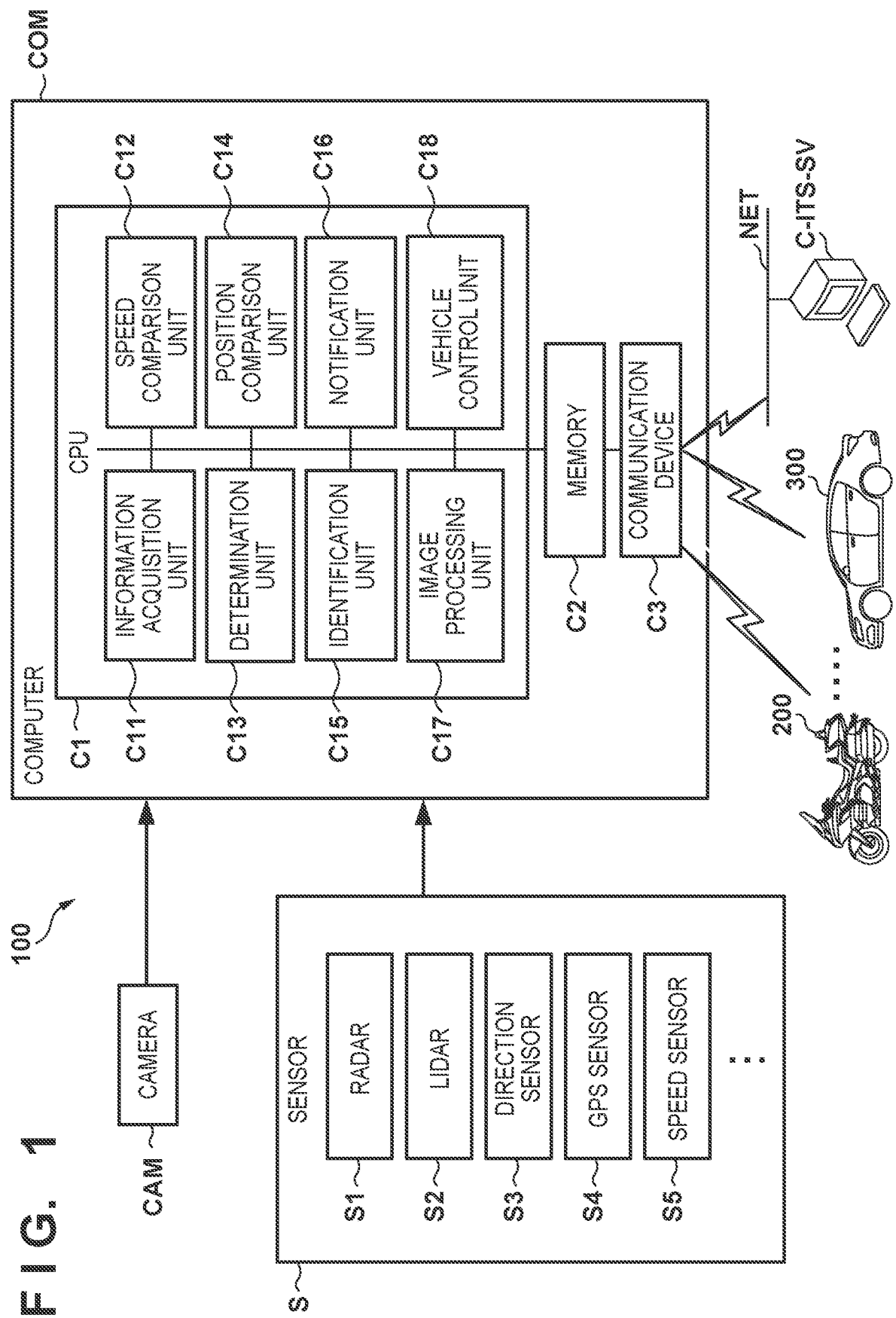
FIG. 1 is a block diagram showing a configuration example of a driving assistance device.

FIG. 1 shows a configuration example of a driving assistance device 100 that performs driving assistance control for a vehicle, and the driving assistance device 100 has a sensor S, a plurality of cameras CAM, and a computer COM. The sensor S has, for example, a plurality of radars S1 and a plurality of LIDARs S2 (Light Detection and Ranging (LIDAR)) as sensing units for sensing vehicle external information. In addition, the sensor S includes, for example, a direction sensor S3, a GPS sensor S4, and a speed sensor S5 as detection units for detecting vehicle travel information.

The radars S1 are, for example, millimeter wave radars, and transmit radio waves and receive the reflected waves from another vehicle in the vicinity. Thus, it is possible to detect the other vehicle in the vicinity of the vehicle and sense the distance (relative distance) from the other vehicle in the vicinity.

The LIDARs S2 can emit pulses of light and detect another vehicle in the vicinity on the basis of the time it takes for the light to return after reflection from the other vehicle in the vicinity, and can sense the speed (relative speed) of the other vehicle in the vicinity on the basis of the distance (relative distance) to the other vehicle in the vicinity or a change in the distance (relative distance).

In addition, the direction sensor S3 including a gyro sensor can detect the rotational movement and the orientation of the self-vehicle, and the computer COM can detect the direction (road) of travel of the self-vehicle on the basis of the detection results of the direction sensor S3. The GPS sensor S4 functions as a GPS information receiver for acquiring vehicle position information, and acquires the current position (positional information) of the self-vehicle in map information. The speed sensor S5 is a sensor that senses the traveling speed of the vehicle (self-vehicle), for example, the rotational speed (velocity) according to the number of wheel revolutions of the vehicle (self-vehicle).

The sensor S and the cameras CAM acquire various types of information of the vehicle (self-vehicle) and information of the surroundings of the vehicle, and input the information to the computer COM.

The computer COM has a CPU (C1), a memory C2, and a communication device C3 (communication interface (I/F)) that perform processing related to vehicle driving assistance control.

The communication device C3 can be connected to a network NET to acquire external information by communicating with a communication device road traffic system. A communication server device C-ITS-SV can distribute road traffic information collected from infrastructure facilities arranged on a road, and the communication device C3 acquires road traffic information indicating road congestion conditions or the like through communication with the communication server device C-ITS-SV on the network NET. Note that the communication device C3 can also directly acquire road traffic information through road-to-vehicle communication with the infrastructure facilities arranged on the road.

In addition, the communication device C3 is capable of communicating with another vehicle (two-wheeled vehicle 200 (including a straddle type vehicle), four-wheeled vehicle 300) in the vicinity of the vehicle (self-vehicle). The communication device C3 can acquire the movement information of the other vehicle through vehicle-to-vehicle communication with the other vehicle (two-wheeled vehicle 200, four-wheeled vehicle 300) in the vicinity of the vehicle.

Figure 5:
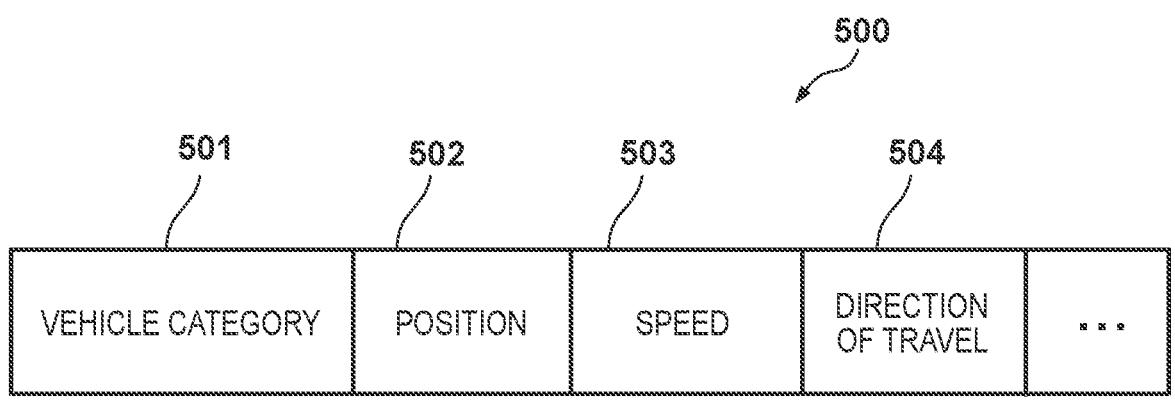
FIG. 5 exemplarily illustrates the configuration of communication packets of movement information.

FIG. 5 exemplarily illustrates the configuration of communication packets of movement information 500. As shown in FIG. 5, the movement information includes a vehicle category 501 indicating that the type of another vehicle is a four-wheeled vehicle or a two-wheeled vehicle, information related to the position 502 and speed 503 of the other vehicle, and information indicating the direction 504 of travel of the other vehicle.

By acquiring the movement information 500 of the other vehicle through vehicle-to-vehicle communication with the other vehicle (two-wheeled vehicle 200, four-wheeled vehicle 300), the driving assistance device 100 can identify the vehicle category (type) of the other vehicle (two-wheeled vehicle 200, four-wheeled vehicle 300) in the vicinity of the vehicle (self-vehicle), and the relative position, speed, and direction of travel of the other vehicle with respect to the vehicle (self-vehicle).

In the movement information, the vehicle category (type) is information specific to each of other vehicles, and in the case of a four-wheeled vehicle, "4" is set as the vehicle category. Furthermore, in the case of a two-wheeled vehicle, "2" is set as the vehicle category.

In the movement information, for example, the positional information sensed by the GPS sensor is set as information relating to the position. Furthermore, in the movement information, for example, the speed information sensed by the speed sensor is set as information relating to the speed. In addition, for example, the direction information sensed by the direction sensor including a gyro sensor is set as information relating to the direction of travel.

The CPU (C1) of the driving assistance device 100 is capable of generating the movement information of the vehicle (self-vehicle) in the form of communication packets shown in FIG. 5, on the basis of the sampling periods of the speed sensor S5, the GPS sensor S4, and the direction sensor S3. The communication device C3 transmits the generated communication packets of the movement information of the vehicle (self-vehicle) to the other vehicle (two-wheeled vehicle 200, four-wheeled vehicle 300).

The other vehicle (two-wheeled vehicle 200, four-wheeled vehicle 300) can identify the vehicle category (type), position, speed, and direction of travel of the vehicle (self-vehicle) by receiving the communication packets of the movement information transmitted from the vehicle (self-vehicle).

The CPU (C1) of the computer COM functions as an information acquisition unit C11, a speed comparison unit C12, a determination unit C13, a position comparison unit C14, an identification unit C15, a notification unit C16, an image processing unit C17, and a vehicle control unit C18 as the functional configuration of the driving assistance device 100 by executing the programs stored in the memory C2.

The information acquisition unit C11 acquires the movement information including the vehicle category indicating that the other vehicle is of four- or two-wheeled type, and information relating to the position and speed of the other vehicle (two-wheeled vehicle 200, four-wheeled vehicle 300), on the basis of the communication of the communication device C3.

The position comparison unit C14 compares the positional information of the vehicle (self-vehicle) acquired by the GPS sensor S4 (GPS information receiver) with the positional information of the other vehicle (two-wheeled vehicle 200, four-wheeled vehicle 300) included in the movement information.

The identification unit C15 identifies the other vehicle located behind the vehicle (self-vehicle) on the basis of the comparison result of the position comparison unit C14. That is, the identification unit C15 identifies the other vehicle located behind the vehicle (self-vehicle) on the basis of the comparison between the positional information of the vehicle (self-vehicle) and the positional information of the other vehicle included in the movement information.

Figure 3A:
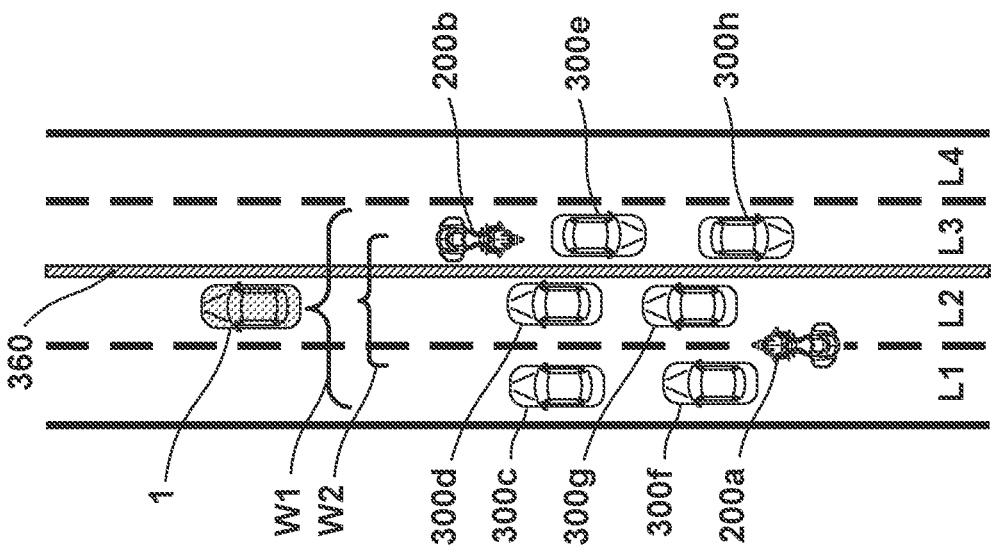
FIG. 3A exemplarily illustrates the identification of other vehicles located behind, FIG. 3B exemplarily illustrates the range of speed acquisition, and FIG. 3C exemplarily illustrates a modification of processing.

FIG. 3A exemplarily illustrates the identification of other vehicles located behind. In the example of FIG. 3A, the road has three lanes (L1 to L3), and a vehicle 1 (self-vehicle) is traveling in the center lane L2. Another vehicle (four-wheeled vehicle 300a) is traveling in front of the vehicle 1 (self-vehicle) (lane L2), and another vehicle (four-wheeled vehicle 300b) is traveling beside the vehicle 1 (self-vehicle) (lane L3).

Furthermore, other vehicles (two-wheeled vehicle 200a, two-wheeled vehicle 200b, and four-wheeled vehicles 300c to 300h) are traveling behind the vehicle 1 (self-vehicle) (lanes L1 to L3).

As shown in FIG. 3A, the identification unit C15 identifies the other vehicles located behind the vehicle 1 (self-vehicle) on the basis of a comparison between the positional information of the vehicle 1 (self-vehicle) and the positional information of the other vehicles (200a, 200b, 300a to 300h)

included in the movement information. In the example shown in FIG. 3A, the two-wheeled vehicle 200a, the two-wheeled vehicle 200b, and the four-wheeled vehicles 300c to 300h are identified as the other vehicles that are located behind the vehicle 1 (self-vehicle).

When the other vehicles (200a, 200b, 300c to 300h) located behind the vehicle 1 (self-vehicle) are identified by the identification unit C15, the information acquisition unit C11 acquires speed information from the movement information of the other vehicles (200a, 200b, 300c to 300h) located behind among the movement information received by the communication unit C3 from the other vehicles (200a, 200b, 300a to 300h) located in the vicinity. The information acquisition unit C11 acquires speeds of the plurality of four-wheeled vehicles (300c to 300h) traveling behind the vehicle 1 (self-vehicle) and speeds of the two-wheeled vehicles 200a, 200b traveling behind the vehicle 1 (self-vehicle) on the basis of the movement information. In this case, the movement information of the four-wheeled vehicle 300a in front of the vehicle (self-vehicle) and the movement information of the four-wheeled vehicle 300b beside the vehicle (self-vehicle) are excluded.

Here, the information acquisition unit C11 can determine whether the other vehicles traveling behind the vehicle 1 (self-vehicle) are four- or two-wheeled vehicles on the basis of the vehicle category in the movement information. When acquiring the speeds to be compared by the speed comparison unit C12 from the movement information, the information acquisition unit C11 can use the vehicle category and positional information to change the range of acquisition.

Figure 3B:
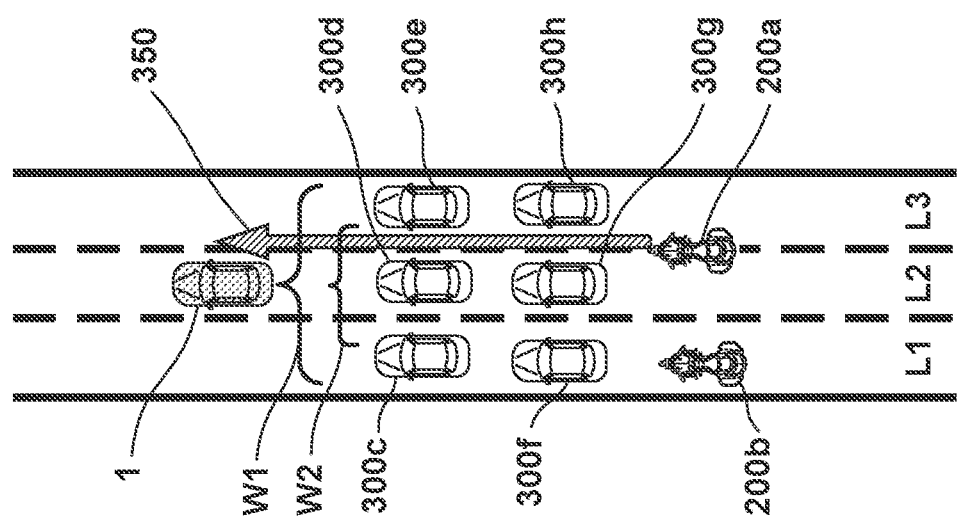

FIG. 3B exemplarily illustrates the range of speed acquisition. For example, if another vehicle is a four-wheeled vehicle, the information acquisition unit C11 acquires speed information of the four-wheeled vehicle from the movement information of the four-wheeled vehicles 300c to 300h located within a first width range W1 in the vehicle width direction of the vehicle 1.

In addition, if another vehicle is a two-wheeled vehicle, the information acquisition unit C11 acquires speed information of the two-wheeled vehicle from the movement information of the two-wheeled vehicle 200a located within a second width range W2 narrower than the first width range W1 in the vehicle width direction of the vehicle 1. In this case, the movement information of the two-wheeled vehicle 200b located outside the second width range W2 is excluded.

The speed comparison unit C12 compares the speeds of the four-wheeled vehicles (300c to 300h) located behind the vehicle 1 with the speed of the two-wheeled vehicle 200a on the basis of the movement information acquired by the information acquisition unit C11. In comparing the speeds, the speed comparison unit C12 can obtain the average speed from the speeds of the plurality of four-wheeled vehicles and compare the average speed with the speed of the two-wheeled vehicle.

On the basis of the comparison result of the speed comparison unit C12, the determination unit C13 determines the presence or absence of the two-wheeled vehicle 200 that travels beside the plurality of four-wheeled vehicles 300 located behind the vehicle (self-vehicle) and approaches the vehicle (self-vehicle).

If the differential speed (VR−VM) between the average speed VM obtained from the speeds of the plurality of four-wheeled vehicles (300c to 300h) traveling behind the vehicle 1 (self-vehicle) and the speed VR of the two-wheeled vehicle 200a is equal to or greater than a threshold speed ((VR−VM)≥Vth) as a result of the speed comparison by the speed comparison unit C12, the determination unit C13 determines that the two-wheeled vehicle 200a traveling beside the plurality of four-wheeled vehicles 300d, 300e, 300g, 300h located behind the vehicle 1 (self-vehicle), and approaching the vehicle 1 (self-vehicle), is present. The two-wheeled vehicle 200a travels beside the four-wheeled vehicles 300d, 300e, 300g, 300h, in the direction of arrow 350 in FIG. 3B, and approaches the vehicle 1 (self-vehicle).

When it is determined by the determination unit C13 that the two-wheeled vehicle 200 approaching the vehicle (self-vehicle) is present, the notification unit C16 notifies the driver of the vehicle (self-vehicle) of the determination result. The notification unit C16 notifies the driver of vehicle 1 of the presence of the two-wheeled vehicle 200a approaching the vehicle 1 in the direction in which the vehicle 1 travels. In order to notify the driver, the notification unit C16 controls a voice output device 91 and a display device 92 (FIG. 2) which are provided in the vehicle 1 (self-vehicle). On the basis of the notification control of the notification unit C16, the voice output device 91 notifies the driver of information by voice, and the display device 92 notifies the driver of information by displaying an image. In this case, the notification unit C16 can change the notification level according to the speed difference between the differential speed (VR−VM) and the threshold speed Vth. For example, the notification unit C16 displays, on the display device 92, an image that combines the approach direction information indicating the direction of approach (approaching to the right side or left side of the vehicle 1) and the speed difference. At this time, the notification unit C16 can perform display control by changing the display color according to the relative distance from the vehicle 1 (self-vehicle) or increasing the image size according to the approach. Furthermore, the notification unit C16 can also estimate the estimated arrival time when the approaching two-wheeled vehicle arrives at the vehicle 1 (self-vehicle) on the basis of the speed difference information, and perform display control so that the estimated arrival time is displayed on the display device 92.

Furthermore, the notification unit C16 can also perform control to combine the approach direction information and the speed difference and output the result as voice information from the voice output device 91. At this time, the notification unit C16 changes the output of the voice information according to the relative distance from the vehicle 1 (self-vehicle). For example, the notification unit C16 can control the voice output device 91 to increase the output of the voice information with the approach of the two-wheeled vehicle.

The image processing unit C17 performs image processing on the image information input from the cameras CAM. The image processing unit C17 analyzes (image processing) the images captured by the cameras CAM to, for example, extract the contours of other vehicles traveling in the vicinity, in the lane in which the vehicle 1 is traveling and an adjacent lane, or to extract road boundaries (for example, structures such as guardrails, lane marks, plantings, and separation zones) on the road.

The vehicle control unit C18 controls the vehicle 1 on the basis of the detection results of the detection units (sensor S, cameras CAM, etc.) that detect information of the vehicle 1 and surrounding information of the vehicle 1, and the image processing results of the image processing unit C17. The vehicle control unit C18 can analyze the travel of another vehicle around the self-vehicle on the basis of the camera image information subjected to the image processing and the sensor information input from the sensor S (radars S1, LIDARs S2), and reflect the analysis results in the control of the vehicle 1.

In a case where the driving assistance device 100 shown in FIG. 1 is mounted on a vehicle, the computer COM may be disposed, for example, in the ECU of a recognition processing system or the ECU of an image processing system that processes information of the sensor S or the cameras CAM, may be disposed in an ECU that controls a communication device or an input/output device, or may be disposed in an ECU in a control unit that performs driving control of the vehicle or an ECU for driving assistance control. For example, as illustrated in FIG. 2 to be described below, the functions of the configuration of the driving assistance device 100 may be distributed to a plurality of ECUs, such as an ECU for the sensor S, an ECU for the cameras, an ECU for the input/output device, and an ECU for driving assistance control.

Figure 2:
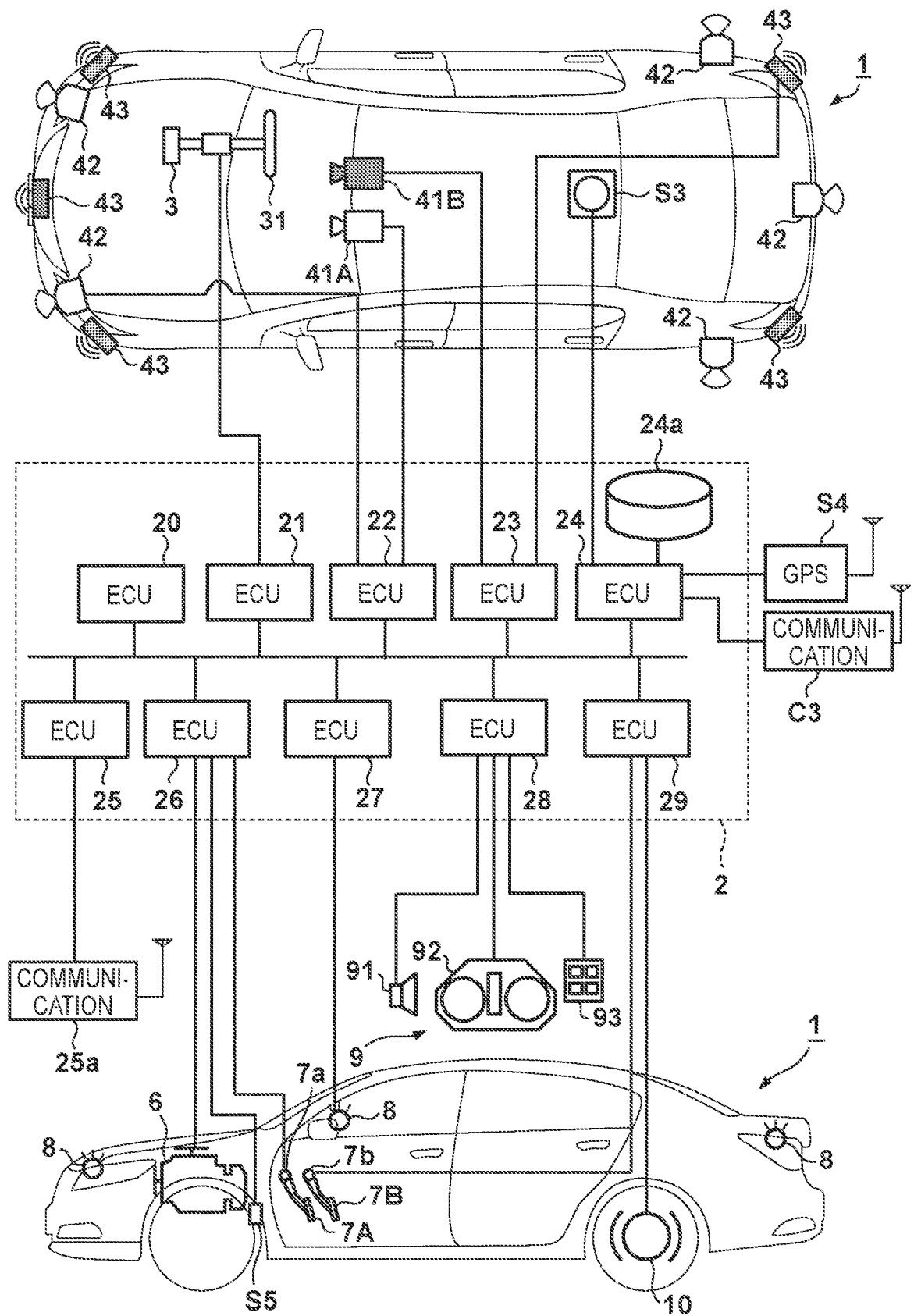
FIG. 2 is a control block diagram in which the configuration of the driving assistance device is disposed in a vehicle.

FIG. 2 is a control block diagram in which the configuration of the driving assistance device 100 is arranged in the vehicle 1, and the control block diagram is configured by distributing the configuration of the driving assistance device 100 to a plurality of ECUs for the vehicle 1 (self-vehicle). In FIG. 2, the vehicle 1 is schematically shown in a plan view and a side view. The vehicle 1 is, for example, a sedan-type four-wheeled passenger vehicle.

A control unit 2 in FIG. 2 has a configuration corresponding to the CPU C1 in FIG. 1 and controls each unit of the vehicle 1. The control unit 2 includes a plurality of ECUs 20 to 29 communicably connected by an in-vehicle network. Each of the electronic control units (ECUs) includes a processor represented by a central processing unit (CPU), a storage device such as a semiconductor memory, and an interface with an external device. The storage device stores programs executed by the processor, data used for processing by the processor, and the like. Each of the ECUs may include a plurality of processors, storage devices, and interfaces.

Hereinafter, functions and the like assigned to each of the ECUs 20 to 29 will be described. Note that the number of ECUs and the functions assigned to the ECUs can be designed as appropriate for the vehicle 1, and can be subdivided or integrated when compared with the present embodiment.

The ECU 20 executes vehicle control related to driving assistance of the vehicle 1 (self-vehicle) according to the present embodiment. In driving assistance, the steering and/or acceleration/deceleration of the vehicle 1 is automatically controlled.

The ECU 20 performs driving assistance control of the vehicle 1 on the basis of the position of the vehicle 1 (self-vehicle) indicating the surrounding situation of the vehicle 1, relative position of other vehicles in the vicinity of the vehicle 1, information of the road that the vehicle 1 travels on, map information, and the like.

The ECU 21 controls an electric power steering device 3. The electric power steering device 3 includes a mechanism that steers front wheels in response to a driver's operation (steering operation) on a steering wheel 31. In addition, the electric power steering device 3 includes a motor that exerts a driving force for assisting in steering operation or automatically steering the front wheels, and a sensor that detects a steering angle.

The ECU 22 and the ECU 23 control detection units 41 to 43 that detect the surrounding situation of the vehicle 1, and perform information processing on the detection results. The detection unit 41 has a configuration corresponding to the camera CAM in FIG. 1. The camera 41 is attached for example to the vehicle interior side of the windshield, in the front of the roof of the vehicle 1, so as to be capable of capturing images of the front of the vehicle 1.

By analyzing (image processing) the images captured by the cameras 41A, 41B, the ECU 22 and the ECU 23 can, for example, extract the contours of objects, such as other vehicles traveling ahead, in the lane in which the vehicle 1 is traveling or in an adjacent lane, or extract road boundaries (for example, guardrails, lane marks, plantings, and the like) on the road.

The detection unit 42 (hereinafter, may be referred to as the LIDAR 42) uses light to detect another vehicle around the vehicle 1 and measure a distance from the other vehicle. The detection unit 42 (LIDAR 42) has a configuration corresponding to the LIDAR S2 in FIG. 1. In the present embodiment, a plurality of the LIDARs 42 are provided around the vehicle 1. In the example shown in FIG. 2, for example, five LIDARs 42 are provided, one at each corner of the front of the vehicle 1, one at the center of the rear, and one at each side of the rear.

The detection unit 43 is, for example, a millimeter-wave radar (hereinafter, may be referred to as the radar 43), which detects another vehicle around the vehicle 1 through radio waves and measures a distance to the other vehicle. The detection unit 43 (radar 43) has a configuration corresponding to the radar S1 in FIG. 1. In the present embodiment, a plurality of the radars 43 are provided around the vehicle. In the example shown in FIG. 2, for example, five radars 43 are provided, one at the center of the front of the vehicle 1, one at each corner of the front, and one at each corner of the rear.

The ECU 22 controls the camera 41A, which is one of the cameras, and LIDARs 42, and performs information processing on the detection results. The ECU 23 controls the other camera 41B and the radars 43 and performs information processing on the detection results. Since two sets of devices for detecting the surrounding situation of the vehicle are provided, the reliability of the detection results can be improved, and since different types of detection units, such as cameras, LIDARs, and radars, are provided, the surrounding environment of the vehicle can be multilaterally analyzed.

The ECU 24 controls the direction sensor S3, the GPS sensor S4, and a communication device C3, and performs information processing on the detection results or communication results. The direction sensor S3 detects the rotational movement and the orientation of the vehicle 1. On the basis of the detection results of the direction sensor S3, the direction (road) of travel of the vehicle 1 can be determined. The GPS sensor S4 detects the current position of the vehicle 1.

The communication device C3 communicates wirelessly with a server that provides map information and road traffic information, and acquires these pieces of information. The ECU 24 is capable of accessing a map information database 24a constructed in the storage device, and the ECU 24 searches for routes from the current position to a destination, etc. The database 24a can be located on a network, and the communication device C3 can access the database 24a on the network to acquire information.

The ECU 25 is equipped with a communication device 25a for vehicle-to-vehicle communication. The communication device 25a performs wireless communication with other vehicles in the vicinity to exchange information between the vehicles. The communication device C3 and the communication device 25a have a configuration corresponding to the communication device C3 in FIG. 1.

The ECU 26 controls a power plant 6. The power plant 6 is a mechanism that outputs a driving force for rotating the driving wheels of the vehicle 1 and includes, for example, an engine and a transmission. For example, the ECU 26 controls the output of the engine in response to the driving operation (accelerator operation or acceleration operation) of a vehicle occupant (driver) detected by an operation detection sensor 7a provided to an accelerator pedal 7A and switches the gear ratio of the transmission on the basis of information such as the speed detected by the speed sensor S5. The ECU 26 controls the power plant 6 in response to an instruction from the ECU 20 and controls the acceleration/deceleration of the vehicle 1.

The ECU 27 controls lighting devices (headlights, taillights, and the like) including direction indicators 8. In the example of FIG. 2, the direction indicators 8 are provided in the front, door mirrors, and rear of the vehicle 1.

An ECU 28 is capable of controlling an input/output device 9. The input/output device 9 outputs information to the vehicle occupant (driver) and receives settings from the driver. The voice output device 91 notifies the driver of information by voice.

The display device 92 notifies the driver of information by displaying an image. The display device 92 is disposed, for example, in front of a driver's seat, and constitutes an instrument panel or the like. Note that, although voice and display are shown here as examples, information may also be notified by vibration or light. In addition, information may be notified by combining some of voice, display, vibration, and light. An input device 93 is a group of switches that are arranged in a position where the driver can operate the switches and that are used to give instructions to the vehicle 1, or may alternatively be included in a voice output device 91.

Furthermore, depending on the level (for example, the degree of urgency) of information that is to be notified, the combination may be changed or the notification mode may be changed. The contents of the notification by the voice output device 91 and the display device 92 are controlled, for example, by the notification unit C16 in FIG. 1 described above.

The ECU 29 controls a brake device 10 and a parking brake (not shown). The brake device 10 is, for example, a disc brake device, and is provided to each wheel of the vehicle 1 to decelerate or stop the vehicle 1 by applying resistance to the rotation of the wheel. The ECU 29, for example, controls the operation of the brake device 10 in response to the driver's operation (brake operation) detected by an operation detection sensor 7b provided to a brake pedal 7B. The ECU 29 controls the brake device 10 in response to an instruction from the ECU 20 and controls the deceleration and stop of the vehicle 1.

[Processing Flow in Driving Assistance Device]

Figure 4:
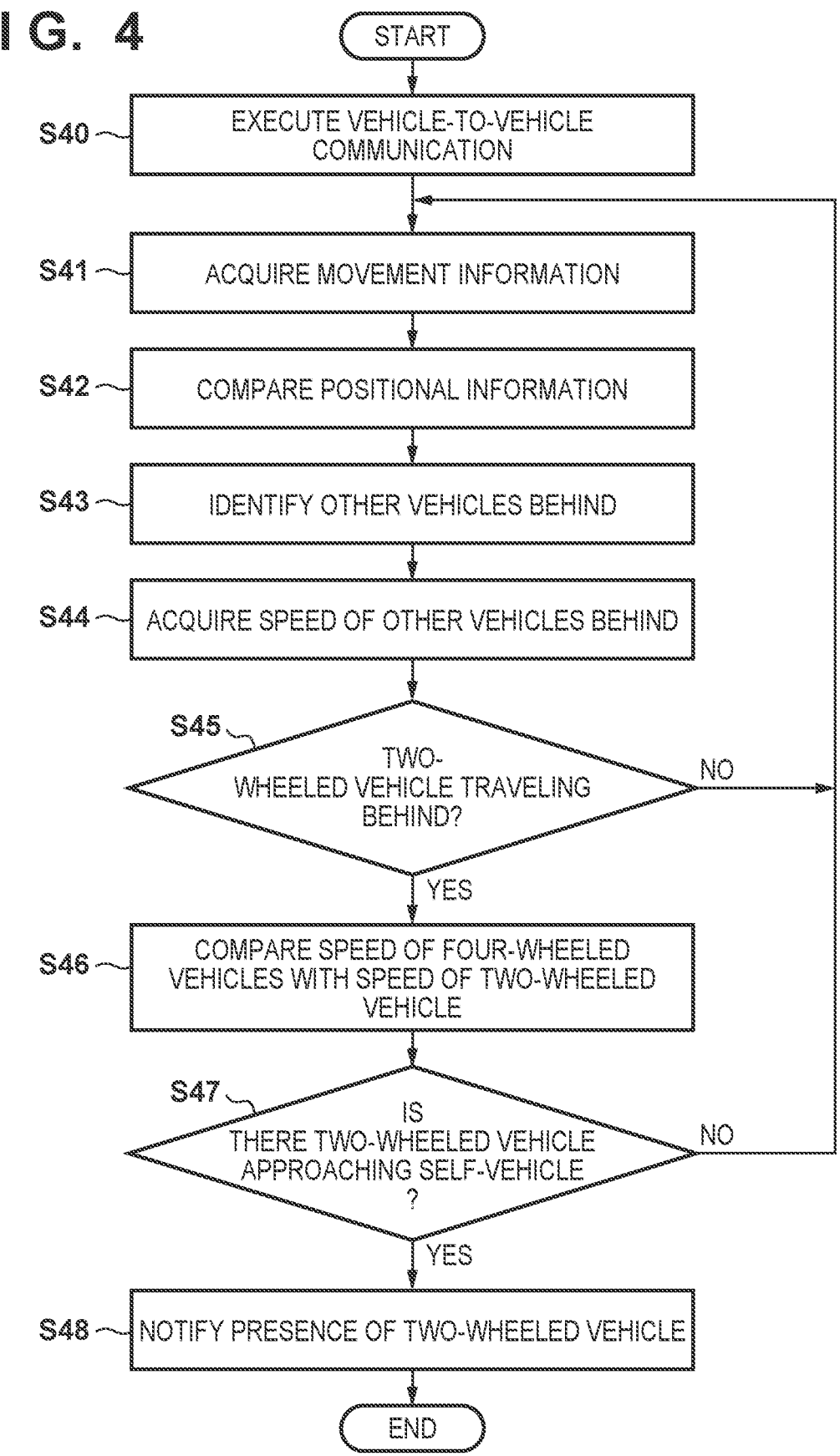
FIG. 4 is a flowchart illustrating the processing of the driving assistance device.

FIG. 4 is a flowchart illustrating the processing of the driving assistance device. In step S40, the communication device C3 executes vehicle-to-vehicle communication. The communication device C3 performs vehicle-to-vehicle communication with another vehicle located in the vicinity of the vehicle 1 via a network.

In step S41, the information acquisition unit C11 acquires movement information. In this step, the information acquisition unit C11 acquires movement information including a vehicle category indicating that the other vehicle is of four- or a two-wheeled type, and information relating to the position and speed of the other vehicle (two-wheeled vehicle 200, four-wheeled vehicle 300), on the basis of the communication of the communication device C3.

In step S42, the position comparison unit C14 compares positional information. The position comparison unit C14 compares the positional information of the vehicle 1 (self-vehicle) acquired by the GPS sensor S4 with the positional information of the other vehicle (two-wheeled vehicle 200, four-wheeled vehicle 300) included in the movement information.

In step S43, the identification unit C15 identifies the other vehicle located behind the vehicle (self-vehicle) on the basis of the comparison result of the position comparison unit C14.

In step S44, the information acquisition unit C11 acquires speed information from the movement information of the other vehicle located behind the vehicle 1 (self-vehicle). In this step, the information acquisition unit C11 acquires speed information from the movement information of other vehicles (200a, 200b, and 300c to 300h in FIG. 3B) located behind among the movement information received by the communication unit C3 from the other vehicles in the vicinity. Here, as shown in FIG. 3B, if the other vehicle is a four-wheeled vehicle, the information acquisition unit C11 acquires the speed information of the four-wheeled vehicle from the movement information of the four-wheeled vehicles 300c to 300h located within the first width range W1 in the vehicle width direction of the vehicle 1, and if the other vehicle is a two-wheeled vehicle, the information acquisition unit C11 acquires the speed information of the two-wheeled vehicle from the movement information of the two-wheeled vehicle 200a located within the second width range W2 narrower than the first width range W1 in the vehicle width direction of the vehicle 1.

In step S45, the information acquisition unit C11 determines whether the two-wheeled vehicle 200 is present among the other vehicles traveling behind on the basis of the vehicle category in the movement information. If the two-wheeled vehicle 200 is not traveling behind the vehicle 1 (self-vehicle) (No in S45), the information acquisition unit C11 returns the processing to step S41 and repeats the same processing in the processing of step S41 and subsequent steps.

On the other hand, if the two-wheeled vehicle 200 is present among the other vehicles traveling behind (Yes in S45), the information acquisition unit C11 advances the processing to step S46.

In step S46, the speed comparison unit C12 compares the speeds of the four-wheeled vehicles located behind the vehicle 1 with the speed of the two-wheeled vehicle on the basis of the movement information acquired by the information acquisition unit C11. In comparing the speeds, the speed comparison unit C12 can obtain the average speed from the speeds of the plurality of four-wheeled vehicles and compare the average speed with the speed of the two-wheeled vehicle.

In step S47, the determination unit C13 determines the presence or absence of the two-wheeled vehicle 200 approaching the vehicle (self-vehicle). If the differential speed (VR−VM) between the average speed VM obtained from the speeds of the plurality of four-wheeled vehicles traveling behind the vehicle 1 (self-vehicle) and the speed VR of the two-wheeled vehicle 200a is equal to or greater than a threshold speed ((VR−VM)≥Vth) as a result of the speed comparison by the speed comparison unit C12, the determination unit C13 determines that the two-wheeled vehicle 200 traveling beside the plurality of four-wheeled vehicles 300 located behind the vehicle 1 (self-vehicle), and approaching the vehicle 1 (self-vehicle), is present (Yes in S47), and advances the processing to step S48.

On the other hand, if the differential speed (VR−VM) between the average speed VM and the speed VR of the two-wheeled vehicle 200a is less than the threshold speed ((VR−VM)<Vth) in the determination of step S47, the determination unit C13 determines that there is no two-wheeled vehicle 200 approaching the vehicle 1 (self-vehicle) (No in S47), and returns the processing to step S41 and repeats the same processing in the processing of step S41 and subsequent steps.

In step S48, the notification unit C16 notifies the driver of the vehicle 1 of the presence of the two-wheeled vehicle 200a approaching the vehicle 1 in the direction in which the vehicle 1 travels.

First Modification

In the step S44 of FIG. 4 as described above, an example has been described in which the information acquisition unit C11 acquires the speed information of the four-wheeled vehicle and the speed information of the two-wheeled vehicle by restricting the position using the first width range W1 and the second width range W2 shown in FIG. 3B.

As a first modification, an example of using information indicating the direction 504 of travel of other vehicles among the information included in the movement information 500 will be described.

Figure 3C:
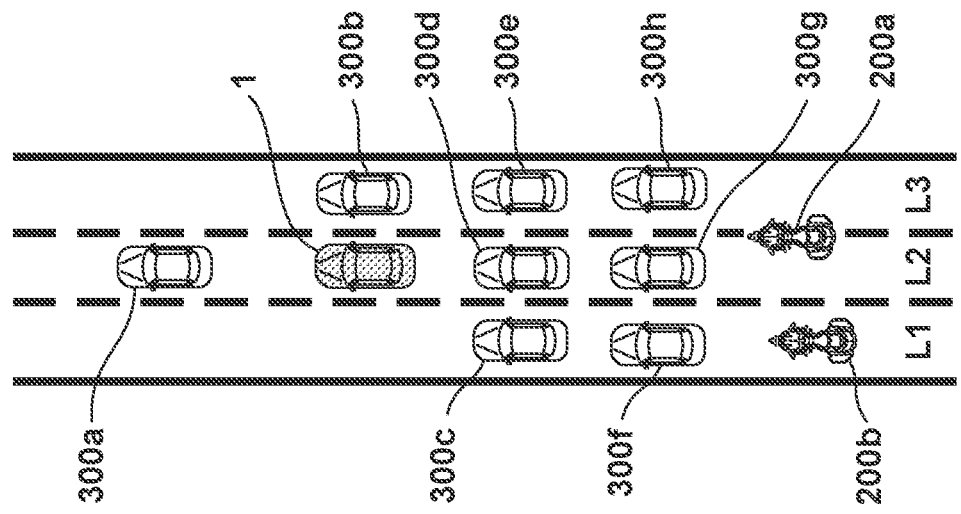

FIG. 3C exemplarily illustrates a modification of processing. In the example of FIG. 3C, the road has two lanes on each side (L1 to L2), and the opposite lane also has two lanes (L3 to L4). Between the lane L2 and the lane L3, there is a road boundary 360 (for example, a structure such as a guardrail or a separation zone) on the road.

It is assumed that the vehicle 1 (self-vehicle) is traveling in the lane L2. If the positional information included in the movement information 500, the first width range W1, and the second width range W2 are used, other vehicles (two-wheeled vehicle 200a, two-wheeled vehicle 200b, four-wheeled vehicles 300c to 300h) are traveling behind the vehicle 1 (self-vehicle).

However, the two-wheeled vehicle 200b and the four-wheeled vehicles 300e, 300h are traveling in the direction (second direction) opposite from the direction (first direction) of travel of the vehicle 1 (self-vehicle).

When the positional information, the first width range W1, and the second width range W2 are used, there may be cases where other vehicles traveling in the opposite lane are included as objects to be processed. However, by adding restrictions using information relating to the direction of travel, the other vehicles traveling in the opposite lane can be excluded from the objects to be processed.

That is, when acquiring speed information from the movement information of other vehicles located behind the vehicle 1 (self-vehicle) in the processing of the step S44, the information acquisition unit C11 refers to the information indicating the direction 504 of travel of the other vehicles included in the movement information 500, and excludes the movement information including the information indicating the direction (second direction) of travel different from the direction (first direction) of travel of the vehicle 1 (self-vehicle). That is, the speed information in the movement information that includes the information indicating the direction (second direction) of travel different from the direction of travel of the vehicle 1 (self-vehicle) is excluded from an object to be acquired. Thus, it is possible to improve the accuracy of processing while reducing the processing load of the driving assistance device 100.

In this case, the movement information of the two-wheeled vehicle 200b and the four-wheeled vehicles 300e, 300h is excluded. The information acquisition unit C11 acquires speed information from the movement information of the four-wheeled vehicles 300c, 300d, 300f, and 300g located within the first width range W1 and traveling in the same direction of travel as the vehicle 1 (self-vehicle), and acquires speed information from the movement information of the two-wheeled vehicle 200a located within the second width range W2 and traveling in the same direction of travel as the vehicle 1 (self-vehicle).

Second Modification

In the first modification, an example has been described in which, when other vehicles traveling in the opposite lane are included as the objects to be processed, the other vehicles traveling in the opposite lane are excluded from the objects to be processed by adding restrictions using information indicating the direction of travel included in the movement information 500.

In a second modification, for example, an example of using the result of image processing based on a camera image will be described. If the image processing unit C17 performs analysis (image processing) of the images captured by the cameras CAM and extracts the road boundary 360 (structure such as a guardrail or a separation zone) on the road between the lane L2 (first lane) in which the vehicle 1 is traveling and the opposite lane L3 (second lane), the information acquisition unit C11 excludes the movement information of other vehicles located in the opposite lane L3 (second lane).

When acquiring speed information from the movement information of the other vehicles located behind the vehicle 1 (self-vehicle) in the processing of the step S44, the information acquisition unit C11 excludes the movement information of the other vehicles located on the opposite lane L3 (second lane) on the basis of the image processing results of the image processing unit C17.

Thus, it is possible to improve the accuracy of processing while reducing the processing load of the driving assistance device 100. In the second modification, the configuration of the communication packets of the movement information 500 only needs to include at least the vehicle category 501, and information relating to the position 502 and the speed 503 of another vehicle. This makes it possible to reduce the load of vehicle-to-vehicle communication between the vehicle 1 (self-vehicle) and another vehicle.

Third Modification

In the embodiment and first and second modifications described above, an example in which the driving assistance device 100 is mounted on a four-wheeled vehicle has been described, but the present invention is not limited to this example, and for example, in FIG. 3A, the vehicle 1 (self-vehicle) in a traffic jam can be replaced with a two-wheeled vehicle. The configuration of the driving assistance device 100 shown in FIG. 1 may be mounted on a two-wheeled vehicle, and the functional configuration of the driving assistance device 100 may be achieved by the ECU of the two-wheeled vehicle.

OTHER EMBODIMENTS

In addition, a vehicle control program for implementing one or more functions described in the embodiments is supplied to a system or apparatus via a network or a storage medium, and one or more processors in the computer of the system or apparatus can read and execute the program. The present invention is also achievable by such an aspect.

SUMMARY OF EMBODIMENTS

Configuration 1. A driving assistance device according to the above embodiments is a driving assistance device (for example, 100 in FIG. 1) that assists in driving a vehicle (for example, 1 in FIG. 3), the driving assistance device (100) comprising: a communication unit (for example, C3 in FIG. 1) capable of communicating via a network (for example, NET in FIG. 1) with another vehicle (for example, 200, 300 in FIG. 1) around the vehicle (1);
an information acquisition unit (for example, C11 in FIG. 1) configured to acquire movement information (for example, 500 in FIG. 5) including a vehicle category indicating that the other vehicle is of four- or two-wheeled type, and information relating to a position and a speed of the other vehicle, on the basis of the communication of the communication unit (C3);
an identification unit (for example, C15 in FIG. 1) configured to identify the other vehicle located behind the vehicle (1) on the basis of a comparison between positional information of the vehicle (1) and the positional information of the other vehicle included in the movement information (500);
a speed comparison unit (for example, C12 in FIG. 1) configured to compare a speed of a four-wheeled vehicle located behind the vehicle (1) with a speed of a two-wheeled vehicle on the basis of the movement information (500);
a determination unit (for example, C13 in FIG. 1) configured to determine whether the two-wheeled vehicle is traveling beside the four-wheeled vehicle and approaching the vehicle (1), on the basis of a result of the comparison; and
a notification unit (for example, C16 in FIG. 1) configured to notify a driver of the vehicle (1) of a result of the determination when it is determined that the two-wheeled vehicle approaching the vehicle (1) is present.

With the driving assistance device according to Configuration 1, it is possible to notify the driver of the presence of the two-wheeled vehicle traveling beside the four-wheeled vehicle located behind the vehicle, and approaching the vehicle. This allows the driver to recognize the presence of the approaching two-wheeled vehicle in advance.

The driving assistance device (100) according to the above embodiments further comprises a GPS information reception unit (for example, S4 in FIG. 1) configured to acquire the positional information of the vehicle, and
a position comparison unit (for example, C14 in FIG. 1) configured to compare the positional information of the vehicle with the positional information of the other vehicle included in the movement information.

The identification unit (C15) identifies the other vehicle located behind the vehicle (1) on the basis of a result of the comparison by the position comparison unit (C14), and
if the other vehicle located behind the vehicle is identified by the identification unit (C15),
the information acquisition unit (C11) acquires speed information from the movement information of the other vehicle located behind among the movement information received by the communication unit (C3) from other vehicles in the vicinity.

With the driving assistance device according to the above embodiments, it is possible to identify the other vehicle located behind the vehicle on the basis of the result of the position comparison, and to acquire the speed information from the movement information of the other vehicle located behind.

Configuration 2. In the driving assistance device (100) according to the above embodiments, the information acquisition unit (C11)
determines whether the other vehicle traveling behind the vehicle (1) is of the four- or two-wheeled type on the basis of the vehicle category in the movement information (500),
if the other vehicle is a four-wheeled vehicle, acquires speed information of the four-wheeled vehicle from four-wheeled vehicles located within a first width range (for example, W1 in FIG. 3B) in a vehicle width direction of the vehicle, and
if the other vehicle is a two-wheeled vehicle, acquires speed information of the two-wheeled vehicle from two-wheeled vehicles located within a second width range (for example, W2 in FIG. 3B) narrower than the first width range in the vehicle width direction of the vehicle.

With the driving assistance device according to Configuration 2, by limiting the range of information acquisition to a range that affects the vehicle (self-vehicle), it is possible to improve the accuracy of processing while reducing the processing load of the driving assistance device.

Configuration 3. In the driving assistance device (100) according to the above embodiments,
the information acquisition unit (C11) acquires speeds of a plurality of four-wheeled vehicles traveling behind the vehicle (1) and a speed of a two-wheeled vehicle traveling around the vehicle (1) on the basis of the movement information (500), and
if a differential speed between the speed of the two-wheeled vehicle and an average speed obtained from the speeds of the plurality of four-wheeled vehicles is equal to or greater than a threshold speed as a result of the speed comparison by the speed comparison unit (C12),
the notification unit (C16) notifies the driver of the vehicle of the presence of the two-wheeled vehicle approaching the vehicle in a direction in which the vehicle travels.

With the driving assistance device according to Configuration 3, if the differential speed between the speed of the two-wheeled vehicle and the average speed obtained from the speeds of the plurality of four-wheeled vehicles is equal to or greater than the threshold speed as a result of the speed comparison, it is possible to notify the driver of the vehicle of the presence of the two-wheeled vehicle approaching the vehicle in the direction in which the vehicle travels.

Configuration 4. In the driving assistance device (100) according to the above embodiments, the notification unit (C16) changes a level of the notification according to a speed difference between the differential speed and the threshold speed.

With the driving assistance device according to Configuration 4, by changing the level of notification according to the speed difference between the differential speed and the threshold speed, it is possible to provide notification according to the level (urgency) of information that is to be notified.

Configuration 5. In the driving assistance device (100) according to the above embodiments, the movement information (500) also includes information indicating a direction in which the other vehicle travels, and if the movement information includes information indicating a direction of travel different from the direction of travel of the vehicle, the information acquisition unit (C11) excludes the movement information that includes the information indicating the different direction of travel, when acquiring speed information from the movement information of the other vehicle located behind.

With the driving assistance device according to Configuration 5, it is possible to improve the accuracy of processing while reducing the processing load of the driving assistance device.

Configuration 6. A driving assistance method according to the above embodiments is a driving assistance method in a driving assistance device (for example, 100 in FIG. 1) that assists in driving a vehicle (for example, 1 in FIG. 3), the driving assistance method comprising:

a communication step (for example, S40 in FIG. 4) in which a communication unit (for example, C3 in FIG. 1) communicates via a network (for example, NET in FIG. 1) with another vehicle (for example, 200, 300 in FIG. 1) around the vehicle (1);

an information acquisition step (for example, S41 in FIG. 4) in which an information acquisition unit (for example, C11 in FIG. 1) acquires movement information (for example, 500 in FIG. 5) including a vehicle category indicating that the other vehicle is of four- or two-wheeled type, and information relating to a position and a speed of the other vehicle, on the basis of the communication in the communication step;

an identification step (for example, S43 in FIG. 4) in which an identification unit (for example, C15 in FIG. 1) identifies the other vehicle located behind the vehicle on the basis of a comparison between positional information of the vehicle (1) and the positional information of the other vehicle included in the movement information (500);

a speed comparison step (for example, S46 in FIG. 4) in which a speed comparison unit (for example, C12 in FIG. 1) compares a speed of a four-wheeled vehicle located behind the vehicle (1) with a speed of a two-wheeled vehicle on the basis of the movement information (500);

a determination step (for example, S47 in FIG. 4) in which a determination unit (for example, C13 in FIG. 1) determines whether the two-wheeled vehicle is traveling beside the four-wheeled vehicle and approaching the vehicle (1), on the basis of a result of the comparison; and a notification step (for example, S48 in FIG. 4) in which a notification unit (for example, C16 in FIG. 1) notifies a driver of the vehicle (1) of a result of the determination when it is determined that the two-wheeled vehicle approaching the vehicle (1) is present.

With the driving assistance method according to Configuration 6, it is possible to notify the driver of the presence of the two-wheeled vehicle traveling beside the four-wheeled vehicle located behind the vehicle, and approaching the vehicle.

Configuration 7. A program according to the above embodiments causes a computer to execute each step of the driving assistance method described in Configuration 6.

With the program according to Configuration 7, it is possible to provide a program for causing a computer to execute each step of the driving assistance method.

OTHER EMBODIMENTS

The present invention can also be implemented by processing in which a program that implements one or more functions in the above-described embodiments is supplied to a system or apparatus via a network or a storage medium, and one or more processors in the computer of the system or apparatus read and execute the program. The present invention can also be implemented by a circuit (for example, ASIC) that implements one or more functions.

The present invention is not limited to the above embodiments and various changes and modifications can be made within the spirit and scope of the present invention. Therefore, to apprise the public of the scope of the present invention, the following claims are made.

What is claimed is:

1. A driving assistance device that assists in driving a first vehicle, the driving assistance device comprising:
at least one processor circuit with a memory comprising instructions, that when executed by the at least one processor circuit, cause the at least one processor circuit to at least:
communicate via a network with a second vehicle in a vicinity of the first vehicle;
acquire movement information including a vehicle category indicating that an other vehicle is of four- or two-wheeled type, and information relating to a position and a speed of the other vehicle, on the basis of the communication;
identify the other vehicle located behind the first vehicle on the basis of a comparison between positional information of the first vehicle and the positional information of the other vehicle included in the movement information;
compare a speed of a four-wheeled vehicle located behind the first vehicle with a speed of a two-wheeled vehicle on the basis of the movement information;
determine whether the two-wheeled vehicle is traveling beside the four-wheeled vehicle and approaching the first vehicle, on the basis of a result of the comparison; and
notify a driver of the first vehicle of a result of the determination when it is determined that the two-wheeled vehicle approaching the first vehicle is present,
execute a control of the first vehicle related to a driving assistance of the first vehicle on a basis of a position of the first vehicle relative to the other vehicle, the control of the first vehicle including controlling at least one of a steering or an acceleration/deceleration of the first vehicle;
wherein the instructions, when executed by the at least one processor circuit, further cause the at least one processor circuit to
determine whether the other vehicle traveling behind the first vehicle is of the four- or two-wheeled type on the basis of the vehicle category in the movement information,
if the other vehicle is a four-wheeled vehicle, acquire speed information of the other vehicle from four-wheeled vehicles located within a first width range in a vehicle width direction of the first vehicle, and if the other vehicle is a two-wheeled vehicle, acquire speed information of the other vehicle from two-wheeled vehicles located within a second width range narrower than the first width range in the vehicle width direction of the first vehicle.

2. The driving assistance device according to claim 1, wherein the instructions, when executed by the at least one processor circuit, further cause the at least one processor circuit to change a level of the notification according to a speed difference between the differential speed and the threshold speed.

3. The driving assistance device according to claim 1, wherein the movement information also includes information indicating a direction in which the other vehicle travels, and if the movement information includes information indicating a direction of travel different from the direction of travel of the first vehicle, the instructions, when executed by the at least one processor circuit, further cause the at least one processor circuit to exclude the movement information that includes the information indicating the different direction of travel, when acquiring speed information from the movement information of the other vehicle located behind.

4. A driving assistance method in a driving assistance device that assists in driving a first vehicle, the driving assistance method comprising:

communicating via a network with an other vehicle in a vicinity of the first vehicle;

acquiring movement information including a vehicle category indicating that the other vehicle is of four- or two-wheeled type, and information relating to a position and a speed of the other vehicle, on the basis of the communication in the communication step;

identifying the other vehicle located behind the first vehicle on the basis of a comparison between positional information of the first vehicle and the positional information of the other vehicle included in the movement information;

executing a control of the first vehicle related to a driving assistance of the first vehicle on a basis of a position of the first vehicle relative to the other vehicle, the control of the first vehicle including controlling at least one of a steering or an acceleration/deceleration of the first vehicle;

comparing a speed of a four-wheeled vehicle located behind the first vehicle with a speed of a two-wheeled vehicle on the basis of the movement information;

determining whether the two-wheeled vehicle is traveling beside the four-wheeled vehicle and approaching the first vehicle, on the basis of a result of the comparison; and notifying a driver of the first vehicle of a result of the determination when it is determined that the two-wheeled vehicle approaching the first vehicle is present.

5. A non-transitory storage medium storing a program for causing a computer to execute the driving assistance method according to claim 4.

\* \* \* \* \*